United States Patent Office 3,320,120
Patented May 16, 1967

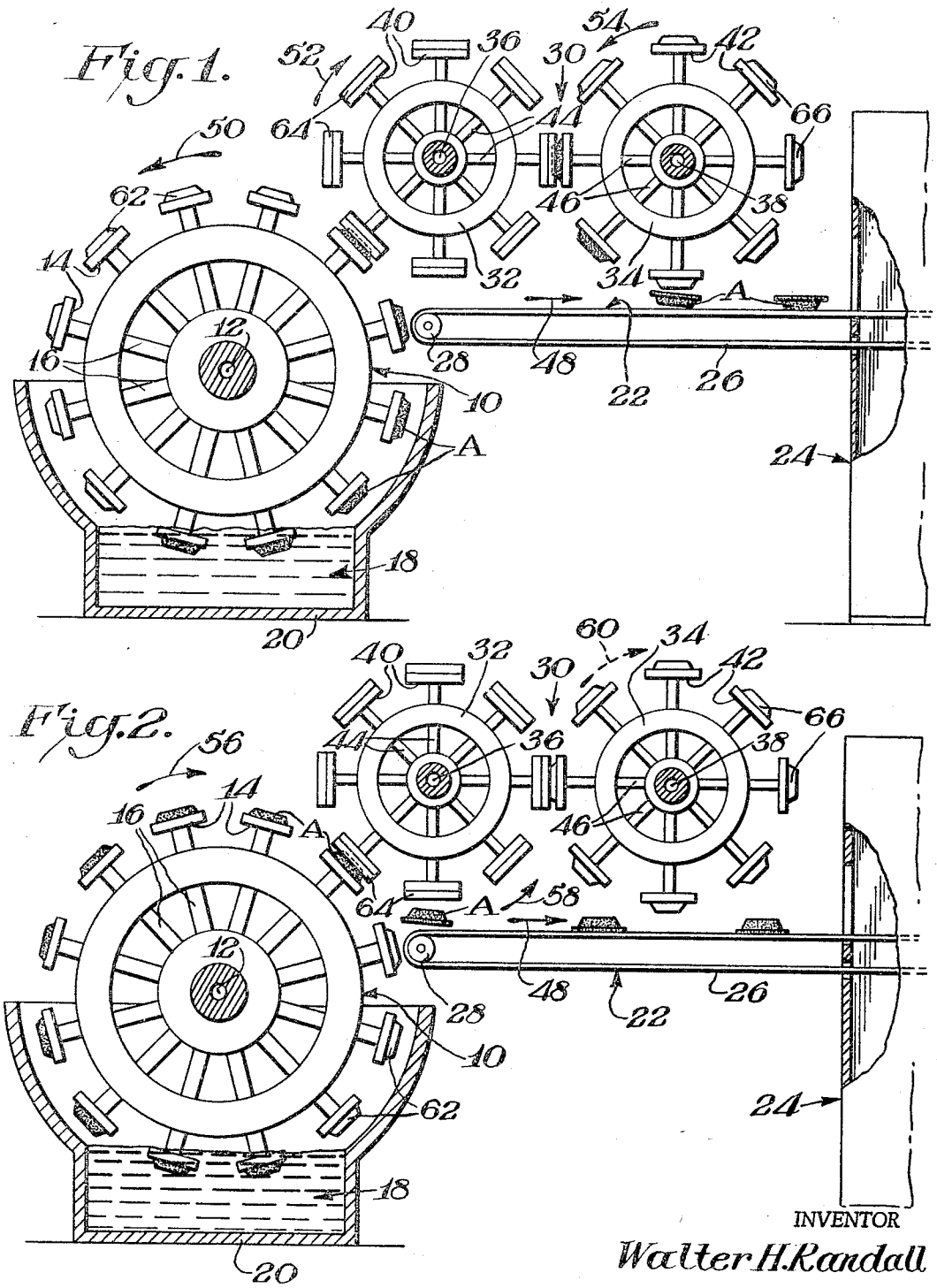

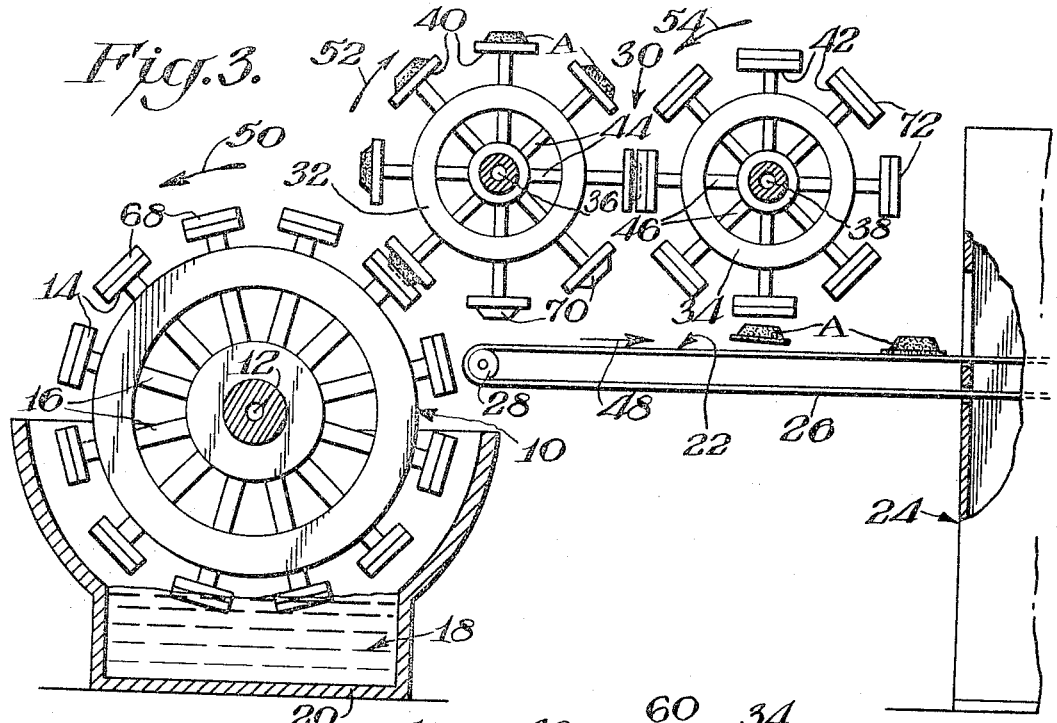
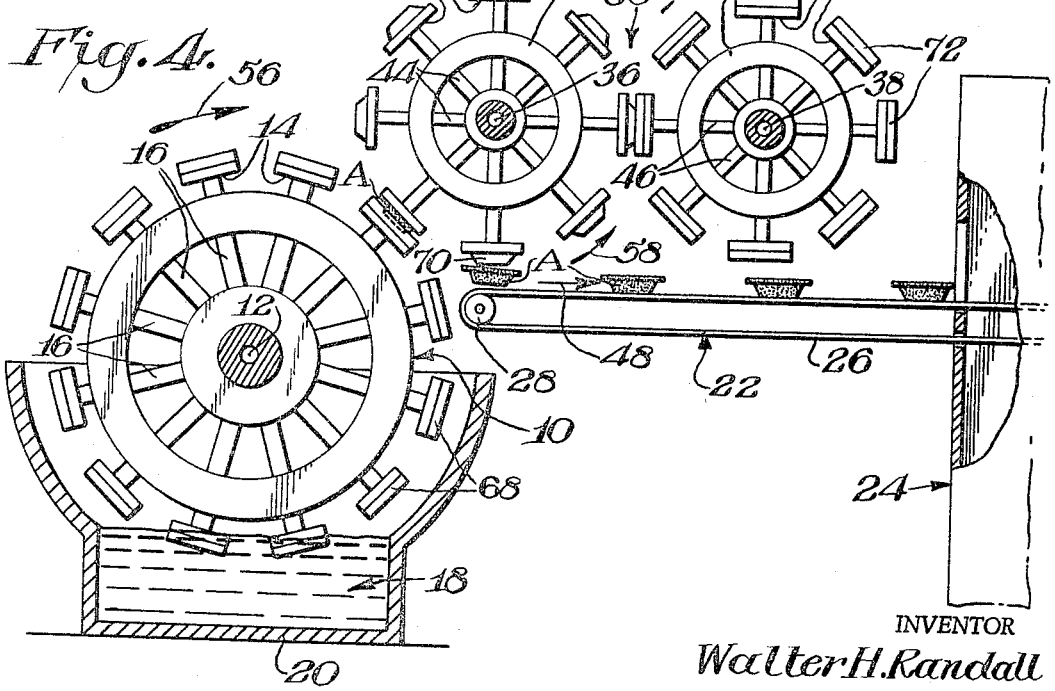

3,320,120
REVERSIBLE MOLDING MACHINE
Walter H. Randall, Waterville, Maine, assignor to Keyes Fibre Company, Waterville, Maine, a corporation of Maine
Filed Apr. 20, 1964, Ser. No. 361,030
4 Claims. (Cl. 162—391)

This invention relates to a reversible arrangement for producing molded pulp articles, and more particularly to machinery for selectively delivering molded pulp articles from the pulp collecting die to the drying chamber conveyor with the die side of the articles oriented either up or down on the conveyor according to the particular drying requirements of the articles.

Prior to the present invention, it has long been the practice to mold pulp articles by suction deposition of pulp slurry on open face forming or collecting dies. The wet articles are then transferred to a generally horizontal, continuously running belt conveyor upon which they are transported through a heated drying chamber to extract moisture from the articles.

The arrangement for transferring the wet, unstable articles from the collecting die to the dryer conveyor desirably includes counterpart or transfer dies which matingly engage the outer or non-die side of the article while it is still on the collecting die, and thereafter support it by vacuum with its shape properly maintained during the transfer. Additionally, the transfer arrangement includes means for delivering the articles very gently to the dryer conveyor with a minimum of "throw" to avoid article distortion upon impact with the conveyor. To this end, the transfer die travels closely above and in the same direction and at approximately the same speed as the dryer conveyor at the time of article release.

Certain problems, however, have been encountered with prior machinery because of the drying requirements of different articles. For instance, sagging and warping of articles while they are heavy with water results in misshapen and unusable articles because they dry with the distorted contours preserved. Consequently, designers include strengthening features in the article itself in an effort to provide stability. In spite of this, it is generally recognized that certain articles must, because of inherent design limitations, be oriented on the dryer conveyor with the die side up; whereas, other articles must be oriented on the dryer conveyor with the die side down.

Transfer dies on prior pulp molding machinery unfortunately have been designed to accept articles from the forming or collecting dies and deposit them on the dryer conveyor without any provision for selectively orienting the articles. Accordingly, it is a general object of the present invention to provide reversible molding machinery for selectively orienting molded pulp articles on the dryer conveyor.

An important object of the present invention is to provide transfer die means for removing damp molded pulp articles from collecting die means and depositing them with the die side oriented either up or down on a dryer conveyor.

Other objects and advantages of the present invention will become apparent to one skilled in the art from a reading of the following description in conjunction with the accompanying drawings wherein similar reference characters refer to similar parts, and in which:

FIG. 1 is a semi-schematic elevational view with parts in sectional elevation showing how the reversible molding machine of this invention transfers dish shaped articles formed on male collecting dies to a dryer conveyor with the die side oriented up;

FIG. 2 is a semi-schematic elevational view with parts in sectional elevation showing how the reversible molding machine of this invention transfers dish shaped articles formed on male collecting dies to a dryer conveyor with the die side oriented down;

FIG. 3 is a semi-schematic elevational view with parts in sectional elevation showing how the reversible molding machine of this invention transfers dish shaped articles formed on female collecting dies to a dryer conveyor with the die side oriented up; and FIG. 4 is a semi-schematic elevational view with parts in sectional elevation showing how the reversible molding machine of this invention transfers dish shaped articles formed on female collecting dies to a dryer conveyor with the die side oriented down.

Referring in more particularity to the drawings, the basic machinery includes a collecting die conveyor means 10 taking the form of a turret or drum rotating in a vertical plane about a horizontal axis 12. Suitable drive means, not shown, are connected to rotate the collecting die drum 10 in either direction of motion. The rotation ordinarily is continuous, and speed may be regulated for different articles. A plurality of die support members 14 positioned around the periphery of the drum are connected in a conventional manner by suitable passages in radial support members 16 with a source of vacuum or suction, not shown.

A pair of suitable porting drums are provided which may be activated selectively according to the direction of rotation of the drum. As explained in more detail below, each porting drum applies vacuum or suction from the source to each individual collecting die support member 14 at the lowermost portion of its circular travel when it is passing through the pulp slurry. Additionally, each porting drum closes the connection with the source of vacuum or suction for each collecting die support member 14 when it reaches its point of tangency with the adjacently located transfer die means, explained below. Because of the well-known construction of such porting drums, they have not been illustrated in detail. Selective activation of the porting drums may be achieved by conventional means such as mechanical valving arrangements in the vacuum and pressure conduits for the respective drums. Closing the conduits to one such drum effectively deactivates it without interfering with the other such drum.

The rotating collecting die drum 10 conveys the individual collecting die support members 14 through a supply of aqueous pulp slurry 18 located in container means 20 such as a large vat resting on the floor. Suitable means, not shown, are provided to insure maintenance of the supply of pulp slurry at a predetermined depth whereby the individual collecting die support members 14 are conveyed first into and then out of the slurry by the rotating conveyor drum 10.

Located closely adjacent the collecting die conveyor drum 10 is a conveyor means 22 adapted to receive damp molded pulp articles A and move them at predetermined speeds through a drying chamber 24. The drying chamber includes heating elements, not shown, in the conventional manner to drive the remaining water out of the molded pulp articles. The conveyor means 22 comprises a generally horizontal endless belt 26 running around pulleys 28, one of which is shown adjacent the collecting die drum 10 and the other of which may be located at the opposite end, not shown, of the drying chamber 24. One of the pulleys 28 may be continually driven by conventional mechanism to correlate the speed of the upper reach of the conveyor with the speed of the collecting die drum 10 and its associated transfer die means, explained below.

The transfer die means 30 comprises a pair of conveyor means 32 and 34 which cooperate to receive articles from the continuously rotating collecting die drum 10 and selectively deposit them gently on the dryer conveyor 22 with the die side oriented either up or down, and with a motion which corresponds with the motion of the dryer conveyor both in velocity and direction. Each transfer die conveyor means 32, 34 comprises a drum rotating in a vertical plane about horizontal centers 36 and 38, respectively. Each drum 32, 34 includes a plurality of transfer die support members 40 and 42, respectively, connected by suitable port means within radial support members 44 and 46, respectively, with a source of suction. Again, each drum 32 and 34 is equipped with a pair of selectively operable porting drums to control application of suction or vacuum to the transfer die support members 40, 42 depending upon direction of rotation, as discussed above in connection with the collecting die drum 10. Suitable drive mechanism, not shown, is connected to rotate the pair of transfer die drums 32 and 34 in opposite directions and at the same peripheral speed. Such drive means are correlated with the drive means for the collecting die drum 10 to insure rotation of the transfer die drum 32 in a direction opposite to the direction of rotation of the drum 10 and at a peripheral speed comparable to that of the drum 10.

Thus, the drive means for the reversible molding machine is connected to operate the belt 26 of the dryer conveyor 22 continuously in the direction of the arrow 48 to convey damp articles from the vicinity of the supply 18 of pulp slurry to the dryer conveyor 24. The collecting die drum may be driven in either direction of rotation and at any desired peripheral speed within a commonly known range. If the drum 10 is driven counterclockwise as indicated by the arrow 50 in FIGS. 1 and 3, the transfer die drum 32 is driven clockwise as indicated by the arrow 52 in FIGS. 1 and 3. The peripheral or surface speed of the collecting die support members 14 and of the transfer die support members 40 are equal. The transfer die drum 34, in this case, is rotated counterclockwise as indicated by the direction arrow 54 in FIGS. 1 and 3, and the peripheral or surface speed of its transfer die support members 42 is equal to the peripheral speed of the support members 40 of the drum 32. The surface speed of the upper reach of the belt 26 of the dryer conveyor may be correlated with the surface speed of the transfer die support members 40 and 42.

When the collecting die drum 10 is rotated oppositely in a clockwise direction, as indicated by the directional arrow 56 in FIGS. 2 and 4, the transfer die drum 32 is rotated counterclockwise as indicated by the directional arrows 58 in FIGS. 2 and 4. In this instance, the transfer drum 34 is rotated clockwise as indicated by the directional arrow 60 in FIGS. 2 and 4. The directional arrow 60 is represented in dashed lines because, as explained in more detail below, transfer die drum 34 is bypassed by the path of travel of molded articles from the container 20 to the drying chamber 24 when the collecting die drum 10 rotates clockwise.

The reversible molding machine of this invention is adapted to employ collecting dies of any generally used variety. For instance, for purposes of illustration only, convex or male type collecting dies 62 are attached to the collecting die support members 14 of the drum 10 in FIGS. 1 and 2. When the machine is set up in this manner, concave or female type transfer dies 64 are attached to the transfer die support members 40 of the first transfer drum 32. Accordingly, male transfer dies 66 are attached to the transfer die support members 42 of the second transfer drum 34. When the collecting die drum 10 is rotated clockwise as illustrated in FIG. 2, it is possible to omit the transfer dies 66 from the second transfer drum 34, as explained below.

If, on the other hand, concave or female collecting dies 68 are attached to the support members 14 of the drum 10, as illustrated in FIGS. 3 and 4, male transfer dies 70 are attached to the support members 40 of the first transfer drum 32. In this instance, female transfer dies 72 are attached to the transfer die support members 42 of the second transfer drum 34. Again, as explained below, it is possible to omit the transfer dies 72 on the second transfer drum 34 when the collecting die drum is rotated clockwise as indicated in FIG. 4.

In operation, the reversible molding machine of this invention forms molded pulp articles by suction deposition of pulp slurry on collecting dies and transfers such articles gently to a drying chamber conveyor with the die side of the article oriented either up or down. The collecting die drum 10 may be driven at any convenient speed to control the time range that the collecting dies are submerged in the pulp slurry. The surface speed of the upper reach of the belt 26 of the dryer conveyor 22 may be correlated with the peripheral speed of the collecting dies of the drum 10. The dryer conveyor 22, of course, always operates in one direction to convey damp molded articles from the vicinity of the container means 20 to the drying chamber 24. The rest of the machinery is adaptable to deposit damp molded articles thereon with a component of motion corresponding both in direction and velocity with the motion of the dryer conveyor.

For instance, in FIG. 1 the collecting die drum 10 is driven counterclockwise to convey male collecting dies 62 through the supply 18 of pulp slurry in the container 20. Suitable porting drum arrangements apply suction to the deposited pulp until each collecting die 62 is rotated into mating relationship with the female transfer dies 64 of the first transfer drum 32. Suitable porting drum arrangements at this point transfer the molded articles from the collecting dies 62 to the transfer dies 64. The molded articles are next transferred from the female transfer dies 64 of the first transfer drum 32 to the male transfer dies 66 of the second transfer drum 34. Thereafter, the molded articles are expelled from the transfer dies 66 to the drying conveyor with speed and direction components coordinated with those of the dryer conveyor. The collecting die side of the articles is oriented upwardly on the drying conveyor.

In FIG. 2 the male collecting dies 62 are rotated clockwise through the supply 18 of pulp slurry. Thereafter, by suitable porting drum arrangements the damp articles are transferred to the female transfer dies 64 of the first transfer drum 32. After only a few degrees of angular motion of the drum 32, the articles are expelled from the dies 64 to the conveyor 22 with speed and direction components coordinated with those of the drying conveyor. The collecting die side of the articles is oriented downwardly on the drying conveyor.

In FIG. 3, female collecting dies 68 are rotated counterclockwise by the collecting drum 10 through the supply 18 of pulp slurry. Suitable porting drum arrangements transfer the damp articles to the male transfer dies 70 of the first transfer drum 32. The articles are next shifted by suitable porting drum arrangements from the dies 70 to female transfer dies 72 on the second transfer drum 34, which finally deposits them on the drying conveyor with the proper speed and direction components. The collecting die side of the articles is oriented upwardly on the drying conveyor.

Finally, in FIG. 4, female collecting dies 68 are rotated clockwise through the supply 18 of pulp slurry. Again, as can be understood, suitable porting arrangements transfer damp molded articles from the collecting dies 68 to male transfer dies 70 on the first transfer drum 32 which thereafter deposits the articles on the drying conveyor 22 with the proper speed and direction components of motion. The collecting die side of the articles is oriented downwardly on the drying conveyor.

Thus, a reversible molding machine has been disclosed which, while capable of employing male or female (or a combination thereof) collecting dies for the deposition of pulp slurry, is adapted to selectively deposit damp molded articles gently on a continually running dryer conveyor with the proper speed and direction components of motion and with the die side of such articles oriented either up or down. No matter what the design restrictions of the particlar article being formed, which dictate the placement of suitable supporting features for proper drying, the reversible machine of this invention is capable of selective operation to properly place such articles on the dryer conveyor. Accordingly, greatly increased freedom of article design is attained for products which may be produced on the single machine of this invention. Since the capital expenditure for large machinery of this nature is considerable, it will be appreciated that such increased flexibility essentially doubles the possible uses for each machine dollar invested.

Machinery of this nature is especially suited to operations where investment in only a single machine is warranted. For instance, in molded pulp testing laboratories, trial production runs of experimental articles may be attained by the single machine disclosed herein. Such machinery is adapted to handle a wide range of articles having divergent design restrictions. Additionally, it will be appreciated that the machinery may be operated with considerably less than a complete compliment of actual dies, only a sufficient number of experimental dies being provided to insure proper testing of experimental articles.

The above described embodiment constitutes only the preferred mode of practicing this invention, and many other embodiments and equivalents may be resorted to within the scope of the actual invention, which is claimed as follows:

What is claimed is:

1. A reversible arrangement for producing molded pulp articles comprising container means for holding a supply of pulp slurry, open face pulp collecting die means mounted for shifting motion along a path leading into and out of the supply of pulp slurry held in the container means to mold articles by suction deposition of pulp thereon, a drying chamber including conveyor means to transport molded pulp articles thereto, open face article transfer die means mounted for shifting motion along another path which is fixed with respect to the path of the collecting die means and the drying chamber conveyor means so that at one point it is contiguous with the path of the collecting die means and at another point it is located closely above and running in the same direction as the drying chamber conveyor means to remove molded pulp articles from the collecting die means and deliver them to the drying chamber conveyor means, the arrangement being adjustable to selectively deliver molded pulp articles to the drying chamber conveyor means with the die side of articles oriented either up or down whereby different molded pulp articles requiring different drying orientation may be produced on the reversible arrangement.

2. A reversible arangement for producing molded pulp articles as in claim 1 wherein the path of the transfer die means is located closely above the drying chamber conveyor means at two spaced points, at only one of which the path is running in the same direction as the conveyor means, and reversible means connected to insure that the articles are properly oriented for drying when they reach the point which is running in the same direction as the conveyor means.

3. A reversible arangement for producing molded pulp articles as in claim 1 wherein the transfer die means includes a first open face transfer die to mate with the pulp collecting die means and a second open face transfer die to mate with the first transfer die, means connected to rotate the first transfer die along a path which at one point is contiguous with the path of the collecting die means and at another point is located closely above the drying chamber conveyor means and to rotate the second transfer die oppositely along a path which at one point is contiguous with and running in the same direction as the path of the first transfer die and at another point is located closely above the drying chamber conveyor means whereby when the first and second transfer dies rotate oppositely in one direction the first transfer die runs in the same direction as the conveyor means at its point located closely thereabove and when they rotate oppositely in the other direction the second transfer die runs in the same direction as the conveyor means at its point located closely thereabove.

4. A reversible arrangement for producing molded pulp articles comprising container means for holding a supply of pulp slurry, a collecting die drum mounted for rotation above the container means, open face collecting die means mounted on the drum for shifting motion along a circular path leading into and out of the supply of pulp slurry to mold articles by suction deposition of pulp thereon, a drying chamber including conveyor means to transport molded pulp articles thereto, a first transfer die drum mounted for rotation above the drying chamber conveyor means, open face article transfer die means mounted on the first transfer die drum for shifting motion along a circular path which at one point is contiguous with the path of the collecting die means and at another point is located closely above the drying chamber conveyor means, a second transfer die drum also mounted for rotation above the drying chamber conveyor means, open face article transfer die means mounted on the second transfer die drum for shifting motion along a circular path which at one point is contiguous with the path of the transfer die means on the first transfer die drum and at another point is located closely above the drying chamber conveyor means, the collecting die drum being mounted for rotation in either direction, the first transfer die drum being mounted for rotation in a direction opposite to the direction of rotation of the collecting die drum, and the second transfer die drum being mounted for rotation in a direction opposite to the direction of rotation of the first transfer die drum whereby molded pulp articles are delivered from the transfer die means on the first transfer die drum to the drying chamber conveyor means for one direction of rotation and from the transfer die means on the second transfer die drum to the drying chamber conveyor means for the other direction of rotation.

References Cited by the Examiner

UNITED STATES PATENTS

| | | | |
|---|---|---|---|
| 1,707,429 | 4/1929 | Chaplain | 162—390 |
| 1,845,831 | 2/1932 | Chaplin | 162—227 |
| 2,760,412 | 8/1956 | Lemieux | 162—391 |
| 2,772,608 | 12/1956 | Emery | 162—392 |
| 2,995,187 | 8/1961 | Wells | 162—390 |

DONALL H. SYLVESTER, *Primary Examiner.*

J. H. NEWSOME, *Assistant Examiner.*